(12) United States Patent
Alcantara Talavera

(10) Patent No.: US 11,525,250 B2
(45) Date of Patent: Dec. 13, 2022

(54) SYSTEM AND METHOD FOR REUSING THE REMNANTS OF WATER IN A HOT-WATER PIPELINE WITH REMOTE GRAPHIC INTERFACE

(71) Applicant: Magno Alcantara Talavera, Mexico City (MX)

(72) Inventor: Magno Alcantara Talavera, Mexico City (MX)

( * ) Notice: Subject to any disclaimer, the term of this patent is extended or adjusted under 35 U.S.C. 154(b) by 149 days.

(21) Appl. No.: 17/060,085

(22) Filed: Oct. 1, 2020

(65) Prior Publication Data

US 2021/0017743 A1 Jan. 21, 2021

Related U.S. Application Data

(63) Continuation of application No. 16/072,881, filed as application No. PCT/MX2017/050001 on Jan. 17, 2017, now Pat. No. 10,844,581.

(30) Foreign Application Priority Data

Jan. 27, 2016 (MX) .................. MX/A/2016/001224

(51) Int. Cl.
*E03C 1/05* (2006.01)
*F16K 11/22* (2006.01)
*F16K 11/00* (2006.01)
*F16K 31/02* (2006.01)

(52) U.S. Cl.
CPC ................ *E03C 1/057* (2013.01); *E03C 1/05* (2013.01); *F16K 11/22* (2013.01); *F16K 19/006* (2013.01); *F16K 31/02* (2013.01)

(58) Field of Classification Search
CPC ........ F16K 19/006; F16K 11/22; F16K 31/02; E03C 1/044; E03C 1/043; E03C 1/023; E03C 2001/005; E03C 1/05; E03C 1/057
See application file for complete search history.

(56) References Cited

U.S. PATENT DOCUMENTS

| 3,886,971 | A | ‡ | 6/1975 | Lundsgaard | ........ B01F 15/0404 137/599.04 |
| 4,700,884 | A | * | 10/1987 | Barrett | ...................... E03C 1/05 126/362.1 |
| 5,261,443 | A | * | 11/1993 | Walsh | ................. F24D 19/1051 122/13.3 |
| 6,446,875 | B1 | ‡ | 9/2002 | Brooks | ..................... E03C 1/05 236/12.12 |
| 6,513,787 | B1 | ‡ | 2/2003 | Jeromson | ................ E03C 1/057 137/559 |
| 8,555,920 | B2 | ‡ | 10/2013 | Hirata | .................. G05D 7/0664 137/599.07 |
| 9,146,007 | B2 | ‡ | 9/2015 | Schwaiger | ................ F17D 1/00 |

(Continued)

*Primary Examiner* — Jessica Cahill

(57) ABSTRACT

Methods and systems for the distribution, regulation and mixture of fluids, but particularly for the regulation of water flow through a tap, within a water distribution system, and for the regulation of the temperature of said flow from mixtures of smaller flows than the flow of the water distribution system, where at least one execution-by-the-user means is coupled, wherein the user has no contact with the mechanical parts of the system. Furthermore, systems for the reuse of water remaining in the pipelines, preventing waste and allowing remote activation, are revealed.

5 Claims, 12 Drawing Sheets

(56) References Cited

U.S. PATENT DOCUMENTS

| | | | | |
|---|---|---|---|---|
| 9,243,756 | B2 ‡ | 1/2016 | Davidson | F17D 3/00 |
| 11,193,259 | B2 * | 12/2021 | Searcy | E03C 1/0408 |
| 2002/0144341 | A1 ‡ | 10/2002 | Zieger | E03C 1/021 |
| | | | | 4/605 |
| 2007/0252012 | A1 ‡ | 11/2007 | Gardner | G05D 23/1393 |
| | | | | 236/12.15 |
| 2007/0289646 | A1 ‡ | 12/2007 | Ravedati | E03C 1/021 |
| | | | | 137/606 |
| 2010/0288385 | A1 ‡ | 11/2010 | Gagne | F16K 7/06 |
| | | | | 137/862 |
| 2011/0168266 | A1 * | 7/2011 | Fiora | E03B 1/048 |
| | | | | 137/1 |
| 2013/0269786 | A1 ‡ | 10/2013 | Song | E03C 1/057 |
| | | | | 137/2 |
| 2014/0053920 | A1 * | 2/2014 | Vasilakis | G01M 3/3254 |
| | | | | 137/456 |
| 2015/0000026 | A1 ‡ | 1/2015 | Elements | G06F 3/013 |
| | | | | 4/443 |
| 2016/0129464 | A1 * | 5/2016 | Frommer | B05B 12/008 |
| | | | | 700/282 |
| 2016/0258144 | A1 ‡ | 9/2016 | Tayenaka | E03C 1/025 |

\* cited by examiner
‡ imported from a related application

SYSTEM AND METHOD FOR REUSING THE REMNANTS OF WATER IN A HOT-WATER PIPELINE WITH REMOTE GRAPHIC INTERFACE

CROSS-REFERENCE TO RELATED APPLICATIONS

The present application claims priority to U.S. patent application Ser. No. 16/072,881, filed on Dec. 19, 2018, which is incorporated herein by reference, in its entirety, for any purpose.

FIELD OF THE INVENTION

The present invention relates to the electromechanical field applied into the supplying, transmitting and distributing water, but more particularly to the field of regulating the flow and temperature of the domestic water through a faucet or water outlet, and by electronic means, enabling wireless communication and reuse of water remaining in pipeline that I normally wasted.

BACKGROUND OF THE INVENTION

Any home that has the service of water from the water mains, includes water outlets like faucets, taps or showerheads also called manual valves that are devices that allow the flow of water after being manually operated, normally through a manual turn of a lever or valve. In an open or active position, said water outlet permits the flow of water, which falls into a reservoir located below, wherein the reservoir includes an output with access to the public drainage. The reservoir has sufficient room for the user to easily contact with the falling water, or for a container to be placed in said reservoir for receiving water. In a closed position, said outlet of water does not permit the flow of water. The water normally comes from one or two water supplies corresponding to the cold water and the hot water, wherein said supplies are connected to the mains or water distribution system, wherein the distribution system of hot water typically includes a water heater that heats water by different methods. Some of these water outlets permit the flow of hot water and cold water simultaneously creating a mixture, commonly called mixer faucet, allowing combinations of hot water and cold water creating different levels of warm water, wherein a combination of comfort exists, but varies according to each user.

In addition, it is known in the art the use of automatic faucets that facilitate the use, promote the hygiene, as well as the saving of water, wherein it is used a presence sensor or a detection system which activates the passage of water flow thereby preventing the contact of the user with the elements of the outlet typically manual, wherein the detection system activates a normally-closed or latching electric-valve, and either after a predetermined period of time or when the presence is no longer detected said electric-valve is closed so that water is not wasted. These automatic faucets are normally used in public places, wherein it is necessary to ensure that the users do not waste the water by leaving the faucet open and wherein, for health reasons, the direct contact with the facilities is prevented, since it can spread diseases. The sensors used are normally of the infrared type, as they are able to detect temperature changes corresponding to the temperature of the human body in its detection zone. Also, in the art is known the use of a sensor or group of sensors for detecting presence in a single detection zone, usually in the area where the water is falling after leaving the faucet outlet. In this regard, in the art it is used only a single electric-valve for each water supply, wherein the electric-valve is located at an intermediate point between the supply and the water outlet, ie, the tap outlet, either cold water or hot water. Said electric-valve is commonly a solenoid valve normally-closed, which when activated, allows full flow of water, i.e. the flow corresponding to the same flow provided by the water mains is transmitted directly to the outlet of water, since the solenoid valve opens completely and closes completely.

It has been found in the art, various inventions used in automatic water distribution systems or utilizing means which prevent direct contact of the user with the mechanical elements, as the U.S. Pat. No. 6,753,554 B1, in which the activation means are used through the feet and knees of the user using switches located on specific parts of the cabinet where the faucet is installed. The patent application 2012/0137426 A1 uses both methods, manual and automatic by means of a solenoid valve to provide water to the user, wherein an energy generating element that avoids the use of batteries is coupled. However, these automatic or semiautomatic faucets use a single solenoid valve, which represents that the flow of water is used at its maximum capacity, i.e. in a closed position does not permit the pass of any flow, and in an open position permits the pass of flow in a maximum capacity utilizing an area equal to the area used by the water mains, and wherein most of the times said flow at its maximum capacity is not necessary. Therefore, automatic faucets that have the ability to regulate the flow of water are needed.

In this regard, it has been found that the flow regulation have motivated the development of various inventions as the patent U.S. Pat. No. 6,219,859 B1 which utilizes servo-valves that open or close the channel of the pipeline at different levels of opening and/or closing and thereby controlling the flow of water, or as the U.S. Pat. No. 8,950,730 B2 which utilizes adjustable motors that are used in the same operation and effect. It has been found that the use of servo valves or motors involves several coupling and control circuits. Furthermore, when they are damaged, the water flow has to be stopped completely during the time the problem is solved.

Most of the systems that provide water to the human being, when the user has selected to use the hot water, a small amount of water at cold or room temperature leaves the faucet prior the hot water reaches the faucet, wherein said small amount corresponds to the water remaining in the pipeline previously, i.e. the hot water that is remained after the previous use of said pipeline. This small remnant is normally wasted to let it go down the drain because it is not at the desired temperature since it begins to cool by heat transfer.

Therefore, it is necessary to create an automatic outlet of water that allows regulation of water flow avoiding physical contact of users incorporating user-friendly interfaces; additionally, including the regulation of flow and temperature. Also, systems that avoid the waste of water remaining in pipelines are equally desirable.

SUMMARY OF THE INVENTION

The present invention relates to the distribution, transmission and dispensing of any fluid, but particularly the regulation of the flow and the regulation of the temperature of the water while going out from a water outlet, wherein a water outlet means any point where a user can be in contact or obtain water as a faucet, shower, tap, etc. The water is regulated by electronic and electromechanical means allowing a remote control, avoiding the waste of water remaining in pipelines and avoiding the manual direct contact of the user with mechanical parts. One skilled in the art will note that this invention applies to equivalent apparatuses whose name may vary as tap, faucet, water outlet, shower-head, etc. Also, the location of application of water flow may vary without affecting the scope such as bathrooms, kitchens, showers, laboratories, industries, etc. Furthermore, one skilled in the art will note that the present invention applies to the distribution of water and any compatible fluid.

In any home, office, industry, etc., wherein there is the water service, a water supply is utilized through a water mains or water distribution system. Normally existing cold water supply and hot water supply, wherein a water heater is coupled. Each water supply, either the supply of hot water or cold water, normally supplied the water through a hose or pipeline with a predetermined diameter, which defines a corresponding flow and pressure, which should meet the needs of water or water flow for the users. For example, the use of ½ inch tubing commonly used as domestic usage, represents a water flow of user comfort (considering corresponding pressure limits), and also involves the use of unions, bends, valves, inlets and outlets that are compatible with said ½ inch pipeline.

Thus, in one embodiment of the present invention, an electronic/electromechanical regulation is applied to the original flow of water define by said diameter of pipeline. The regulation of the flow of water is performed through a plurality of electromechanical means that, using electrical signals, allow the flow or block the flow of water before the outlet of water, wherein the water has been provided from a distribution system of water with a flow defined by a predominant pipeline diameter which will be called diameter of operation, and wherein each of these electromechanical means has a diameter smaller than the diameter of operation of said distribution system. Before the water outlet, each of these supply pipelines, either cold water or hot water, is divided into a number N of sub-pipelines of smaller areas thereby defining sub-channels of flow where the water flows. The division is accomplished by a multiple or divisor also known as manifold or splitter, which has a compatible entry with the original diameter of the water supply or a coupling, and the plurality of outlets with smaller areas divide the flow thus defining the sub-channels. The electromechanical means, which by electrical signals or impulses, permit the flow or block the flow, may be electric-valves, which are coupled to each sub-channel to allow or block their flow individually. In one embodiment, the electric-valves are solenoid valves which can be found on the market with different diameters of operation, that is, different sizes, and at relatively low costs, while its operation is simple and its replacement, in case of failure, is easy.

The control of the electric-valves is performed by a sensor or a microcontroller, which sends the electrical signals of control, and wherein electronic circuits for coupling, timing, protection and/or isolation known in the art can also be used. In one embodiment of invention, the electrical signals that control the electric-valves follow a performance pattern to regulate the flow from a small flow to a large flow for saving water.

Therefore, by dividing the original water flow from the water supply in a number N of sub-channels the water flow is being digitized thus allowing the direct control that can be accomplished by different electronic means well known in the art. In one embodiment, the electric-valves are solenoid valves. In one embodiment, the whole set of sub-channels have the same diameter to each other. In another embodiment of invention, the sub-channels have different diameter and/or are configured in different groups of the same diameter. In another embodiment, each sub-channel is different from the other.

In one embodiment of invention, the output of each electric-valve is directly connected to the outlet of water. In another embodiment, the output of each electric-valve is connected to a second manifold or splitter which operates inversely to join the plurality sub-channels into a single channel whose diameter may be equal to the diameter of operation of the water supply, wherein flow of water is now defined by the active or open state of the sub-channels. A programmable element, like a microcontroller, controls the opening and closing of each electric-valve of each sub-channel, either independently or in groups. In one embodiment of invention, the capacity of flow of all the sub-channels corresponds to the original flow of the water supply, considering also tolerances generated by the frictions and pressure drops due to the implementation of said sub-channels. The original flow is defined by the area or diameter of the distribution system or water mains, either hot or cold, where mathematical formulas well known in the art are applied. Also, the shape and angles of the multiple or splitter should allow the natural flow of water, avoiding curves and frictions, i.e. maintaining a hydrodynamic behavior. In one embodiment of invention, an arithmetic equivalence is performed to divide the original flow. This is, for example, for a flow defined by a diameter of 1 inch, it can be divided into four sub-channels of ½ inch, or 16 sub-channels ¼ inch, 64 sub-channels ⅛, or combinations thereof available in the market enabling at least acceptable approaches. An example of combination of different groups of diameters may be three sub-channels ½ inch plus four sub-channels ¼ of areas whose sum is equal to the original area corresponding 1 inch. In one embodiment, the total sum of the areas of the sub-channels is either greater or less than the area of the original supply.

Thus a partial digitization of the flow of fluid is defined. One skilled in the art will note that the amount of sub-channels and their corresponding areas may vary without affecting the scope of the present invention, wherein the present invention is able to implement combinations of sub-channels of different diameters to save resources. Also, the performance pattern is selected from the list of: regulating temperature by substantially maintaining the flow, regulating the flow by substantially maintaining the temperature, and regulating the temperature by regulating the flow, wherein the selection is based on criteria defined by the user.

Also, in one embodiment of the invention the electromechanical means for flowing or blocking the flow of fluid are latching solenoid valves, which allows energy saving.

Furthermore, the digitization of water flow, either for the hot water supply or cold water supply, allows the regulation of the temperature of the water at the water outlet by create combinations of closed sub-channels and opened sub-channels, either in the hot water and/or cold water, which are mixed together creating warm water in said water outlet.

For example, for a water supply pipeline of diameter D, four sub-channels of diameter D/2 are used, or three sub-channels of diameter D/2 and four sub-channels of D/4 are used. Also combinations of different diameters which substantially provide the same amount of water corresponding to D, and are available in the market, are used.

A person skilled in the art will note that the combinations for digitizing the flow may vary without affecting the subject of the present invention. Also, many of these combinations may be defined based on the market, in other words, based on the availability of items on the market.

A combination is defined by any configuration of sub-channels in the closed state and/or in open state. For example, if there are N sub-channels all different with each other, the number of possible combinations will be $2^N$ wherein these combinations also apply for combinations of cold water with hot water. In one embodiment of the invention, the number of sub-channels and flow capabilities, defined by their diameters, will be registered in the memory of the microcontroller in order to perform the calculations for the combinations according to any performance pattern. In one embodiment of invention, one single first manifold and one single second inverted manifold are used for both, cold and hot water supplies, wherein said manifolds have sufficient divisions.

Once the regulation of the water flow and the temperature is accomplished using electronic means as a microcontroller, a user interface that allows a friendly interaction of the user with the flow and temperature control system is desired, wherein it is desired to maintain a similar operation to that found in the art.

In this regard, the present invention includes at least one detection area, wherein the detection areas are defined by an area in which one or more sensors detect the presence of an object or human being. In one embodiment, the detection areas detect the movement towards of objects or a human being. Said sensors which detect the movement towards of objects or human beings, are, but not limited to, ultrasound sensors, capacitive sensors, Doppler sensors, etc.

A first detection area, wherein the area is located where the water is falling after the water outlet, defines the activation of the electromechanical means in any initial default combination of opened and closed sub-channels. In one embodiment, said initial default combination provides a minimum water flow or a minimum flow of comfort for the user, wherein said minimum comfort flow is pre-configured in order to avoid the use of a maximum flow at the beginning and thus saving water.

A second detection area, different than the first area, defines the activation of the flow regulation in one direction. In other words, once it is detected an object in said area, the water flow will be increased to a next possible unit, i.e., a combination that allows an immediate larger flow than the previous according to the installed capacity of the sub-channels. In one embodiment, a third detection area, different than the first and second areas defines the activation of the regulation of flow, wherein the regulation will be in the opposite direction to the second area. In other words, once it is detected an object in said area, the water flow will be decreased to a next possible unit, i.e., a combination that allows an immediate smaller flow than the previous, according to the installed capacity of the sub-channels. In one embodiment of invention, the regulation of the flow, defined by the first, second and/or third detection areas, is accomplished maintaining the temperature.

In one embodiment of invention, a fourth detection area and a fifth detection area, located in different positions to the first, second and third areas, define the activation of the regulation of temperature. Thus, once it is detected an object in the fourth area, the temperature of the water will be increased to a next possible unit, i.e., a combination that allows an immediate higher temperature than the previous one according to the installed capacity of the sub-channels. Furthermore, once it is detected an object in the fifth area, the temperature of the water will be decreased to a next possible unit, i.e., a combination that allows an immediate lower temperature than the previous one, according to the installed capacity of the sub-channels. In one embodiment of invention, the regulation of the temperature, defined by the fourth and/or fifth detection areas, is accomplished maintaining the flow of water.

In one embodiment of invention, the second and third zones activate the regulation of the temperature of the water instead of the flow of water.

In an embodiment of invention, after detecting the presence of an object, the first detection zone also detects the approaching of said object, wherein once an approaching is detected the flow is increased similarly to the detection of the second area.

In an embodiment of the invention, a detection system with two partially overlapping detection areas, i.e. a first area and a second area, is used, wherein the overlapping area may be a third area. The area of overlapping is the area of the flow activation, while each single area regulates the temperature, the first area increasing the temperature and the second area decreasing the temperature. Also, each detection area detects the approaching of objects so that once an approaching is detected, the flow is increased: maintaining the temperature, increasing the temperature or decreasing the temperature corresponding to the overlapping area, the first area and the second area respectively.

The water temperature can be measured by a temperature detector or thermocouple coupled to the microcontroller, or simply sensed by the user.

In an embodiment of the invention, the detection means, detect through the material that is made the deposit, therefore said means are located below said deposit and pointing to the area of the water outlet.

In one embodiment of invention, a user interface using a speech recognition module or voice recognition module is coupled to the system, wherein it will be called control by voice. The control by voice can, either replace the user interface by detection areas, or complement said interface by detection areas. In one embodiment of invention, the first, second and third detection areas activate the regulation of the flow of water, and the control by voice regulates the temperature accordingly. In one embodiment, the control by voice performs in parallel the same functions as the interface by detection areas taught in this document.

The control by voice performs temperature regulation or flow regulation utilizing the recognition of words or phrases, named voice commands, that once they are detected, the corresponding command is sent to the microcontroller in order to be interpreted and to perform the corresponding operation. The voice commands can be, but are not limited to, words or phrases such as "hot", "cold", "hotter", "cooler", "less hot", "less cold", "more water", "less water", "high", "stronger", "warm up", "maximum cold" and equivalents, or combinations of these phrases. The module coupled to the microcontroller includes a microphone and optionally a speaker as a means of audible notification. The microphone is located at a position avoiding obstacles.

In one embodiment of the invention, a transceiver is coupled to the microcontroller for a remote communication with a compatible electronic device such as a mobile phone or through a website, including websites within a local area network or LAN. In this regard, in one embodiment of the invention, an application implemented through said compatible electronic device activates the flow of water, wherein the flow includes features pertaining to amount of flow and temperature i.e. parameters able to be defined in said electronic device. Thus, a user can remotely activate, for example, the flow of water in the shower-head in order to take a shower, wherein the user is notified by either remote and/or in situ means the moment when the flow of water has reached the selected parameters. The notification may be by visible and/or audible electronic means, either through the electronic device, or elements coupled to the microcontroller in situ like a speaker, LEDs, etc.

In an embodiment of the invention, and in order to avoid the waste of water occurred by remainder water in the pipelines when idle, a system of electric-valves connected to the water supply, an auxiliary deposit, and before the water outlet, including a temperature sensor or thermocouple, are coupled in order to allow said remainder water to be driven into the auxiliary deposit for its reutilization. The system of electric-valves and the temperature sensor, have operational communication with the microcontroller. One skilled in the art will note that said system of electric-valves applies either to the hot water supply as well as the cold water supply. Thus, the flow can be activated remotely, wherein the system of electric-valves prevents the flow of water that corresponds to the water remaining in pipeline, to flow to the outlet of water directing the flow to the auxiliary deposit. Once in the auxiliary deposit, the water can be reinjected into the water distribution system (in cold water, for example) using a corresponding compatible pump or by gravity into a cistern or equivalent. Thus, coupling a microcontroller into the system and a transceiver to the microcontroller, the flow can be activated remotely avoiding the waste of water normally wasted when the user is waiting for hot or warm water. This feature is useful when the user requires hot water, for example when showering, so that through an application on his mobile phone informs the system that he will take a shower, so that the system opens the flow, wherein the water remaining in the pipeline without the proper temperature for the shower, is moved into the auxiliary deposit. Once the water with the proper temperature is available, the system of electric-valves directs the water towards the outlet of water, in this case the shower. Once water is available, the system informs the user remotely or by means of notification in site.

DETAILED DESCRIPTION OF THE INVENTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed, and that within this document will be called programmable element. When the hardware modules or apparatus are activated, they perform the methods and processes included within them.

Figure 1:
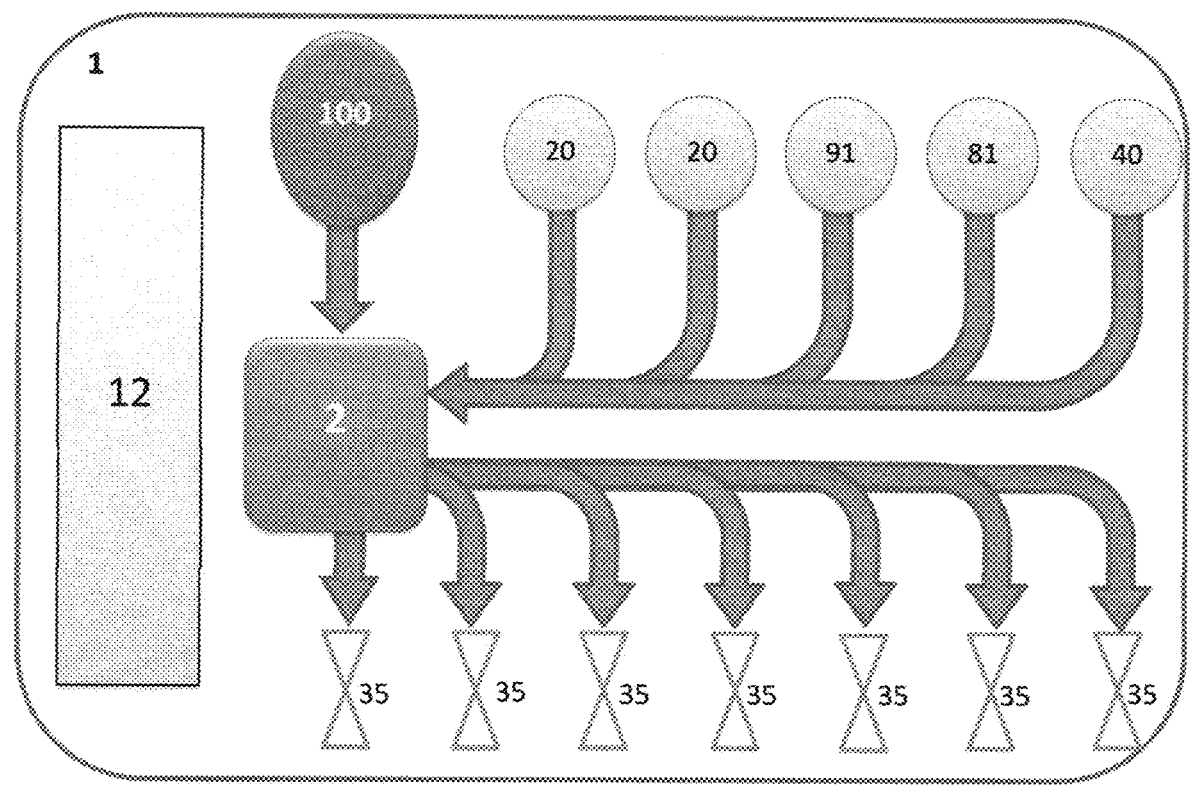
FIG. 1 is a block diagram of the electrical, electronic and electromechanical elements of the present invention.

FIG. 1 shows a diagram of the system 1 that represents the electrical, electromechanical and electronic elements of an embodiment of the present invention including a programmable element 2 such as a computer, microcontroller, microprocessor, FPGA, etc., and wherein said programmable element is in operational communication with each element of the system 1; a plurality of electromechanical means 35 that allow blocking and flowing of a fluid, such as the electric-valves; a power supply 12 which includes supply either from the electric mains and/or from rechargeable batteries; a plurality of presence detectors or motion detectors 20 for interaction with a user through touchless means, which in one embodiment of the invention also detect the approaching and moving away of objects; in one embodiment of invention, a water level sensor 91 for a deposit, a water flow sensor 81 (flowmeter); a temperature sensor or thermocouple 40; and in one embodiment of invention a user interface through the recognition of words or phrases that will be called voice control 100.

Figure 2A:
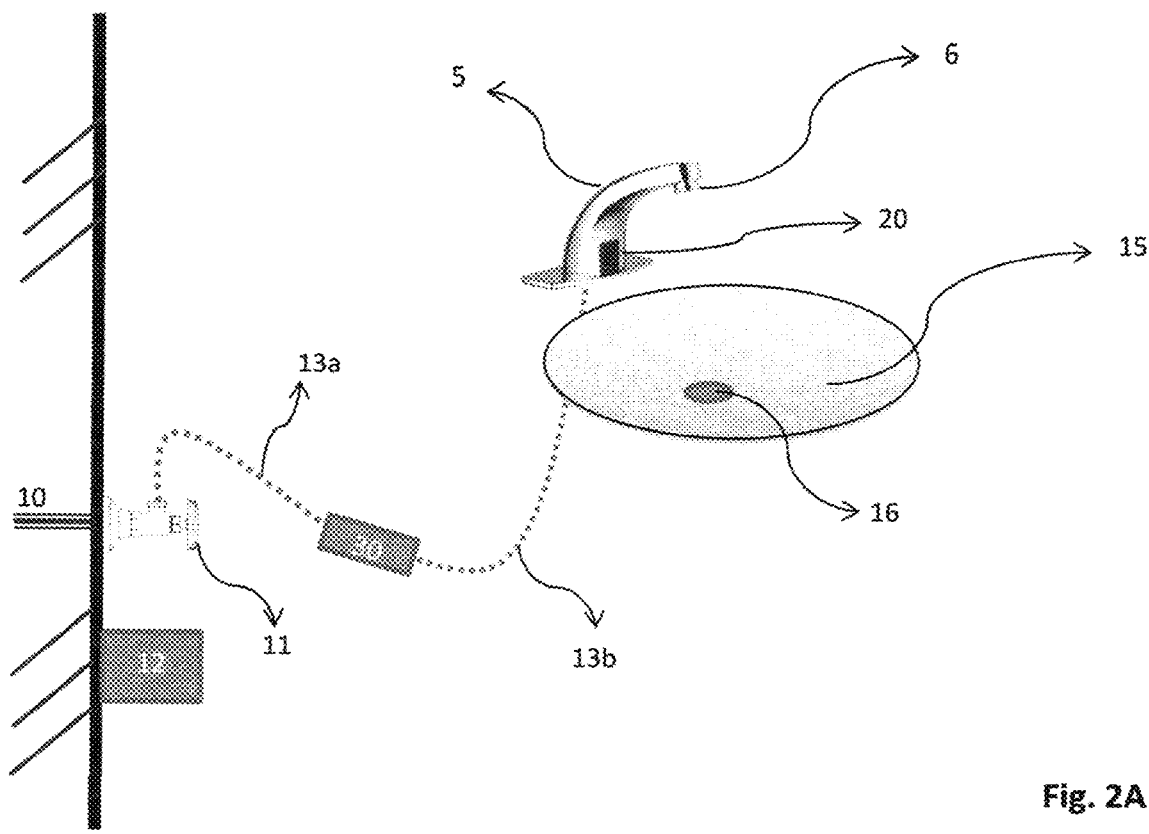
FIG. 2A shows a configuration of an automatic faucet for a single water supply as is customary in the art.

FIG. 2A shows a common configuration of a simple automatic tap 5 for a supply of cold water as it is found in the art, wherein there is only one water supply 10, normally of cold water. The water moves from the supply 10 towards a manual valve 11 and through a pipeline 13a, the water reaches an electromechanical medium 30 which allows flow or blocks the flow through electrical signals transmitted normally from a sensor 20. The medium 30, in an open state, allows the passage of water flow that travels through a pipeline 13b, to the outlet 6 of the tap 5, which consequently falls by gravity onto the deposit 15, which has a connection to the drain 16. The medium 30, in a closed or locked state, does not allow the passage of water to the tap 5, however, during inactivity, a remnant of water is static in the section that represents the pipeline 13b. One skilled in the art will note that the pipeline may be a rigid tube or a flexible hose.

In order to keep the flow, the diameters of the pipelines 13a and 13b are the same, wherein said diameters, as well as the diameters of operation of the elements 30 and 11, are compatible to each other, and wherein normally the selection of said diameters of operation is based on the needs of the user and the diameter of the pipeline of the water mains supply 10, wherein a predominant diameter of operation for a place results.

Figure 2B:
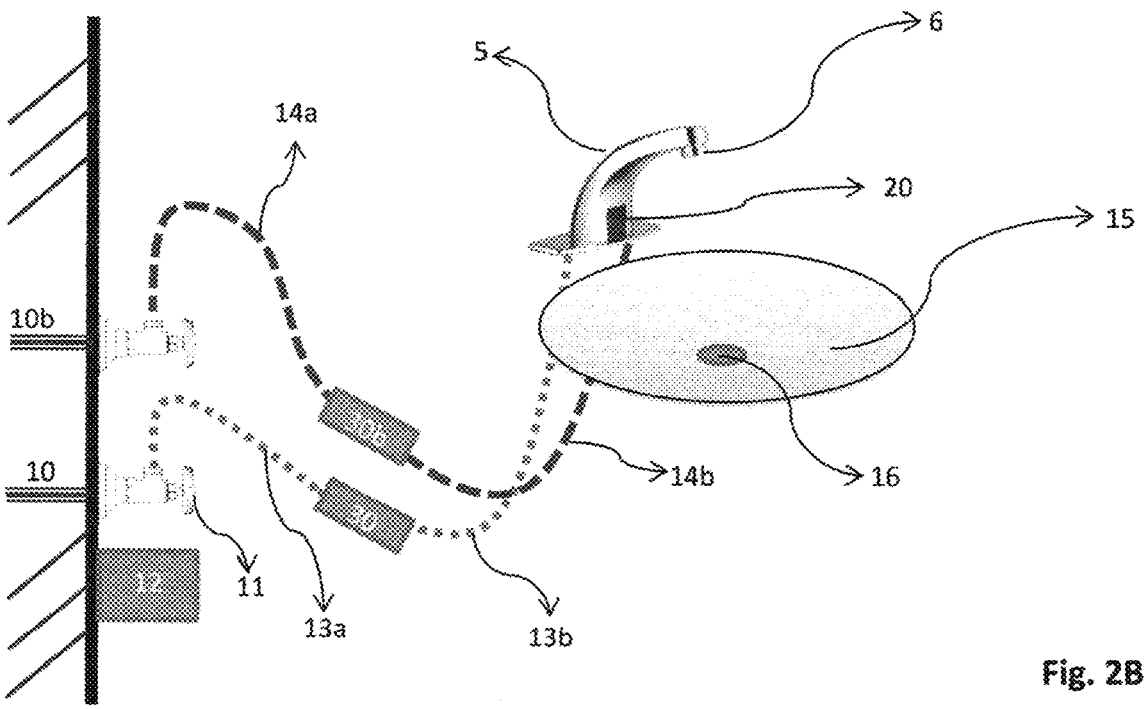
FIG. 2B shows a configuration of an automatic faucet for two water supplies as is customary in the art.

FIG. 2B shows a common configuration of an automatic faucet 5 for a cold water supply and a hot water supply as they are found in the art, wherein there are two water supplies 10 and 10b that are typically cold water 10 and hot water 10b, wherein the hot water supply 10b first passes through a heater or boiler (not shown in FIG. 2B), i.e. a heating stage. The water travels from the supply 10 or 10b to a manual valve 11 or 11b and through a pipeline 13a or 14a, the water reaches an electromechanical medium 30 or 30b permitting flow or blocking the flow of hot or cold water respectively by the use of electric signals transmitted either from a motion sensor 20, an electronic circuit, or through a manual interface such as a switch. The medium 30 or the medium 30b, in an open state, allows the flow of cold or hot water through a pipeline 13b or 14b to the outlet 6 of the faucet 5, and then fall by gravity into the reservoir 15 which has an outlet to the drain 16. If both, medium 30 and medium 30b, are in an open position, just before the outlet 6 of the faucet 5 both water flows are mixed resulting in warm water. The medium 30 or medium 30b, in a closed or locked position, does not allow the passage of water to the faucet 5, however, during inactivity, a remnant of water is static in the section that represents the pipeline 13b or 14b.

For illustrative purposes the following electrical connections are not shown: between the sensor 20 and either the medium 30 or medium 30b, and between the power supply 12 and either the sensor 20 and/or the medium 30 and/or 30b.

Figure 3:
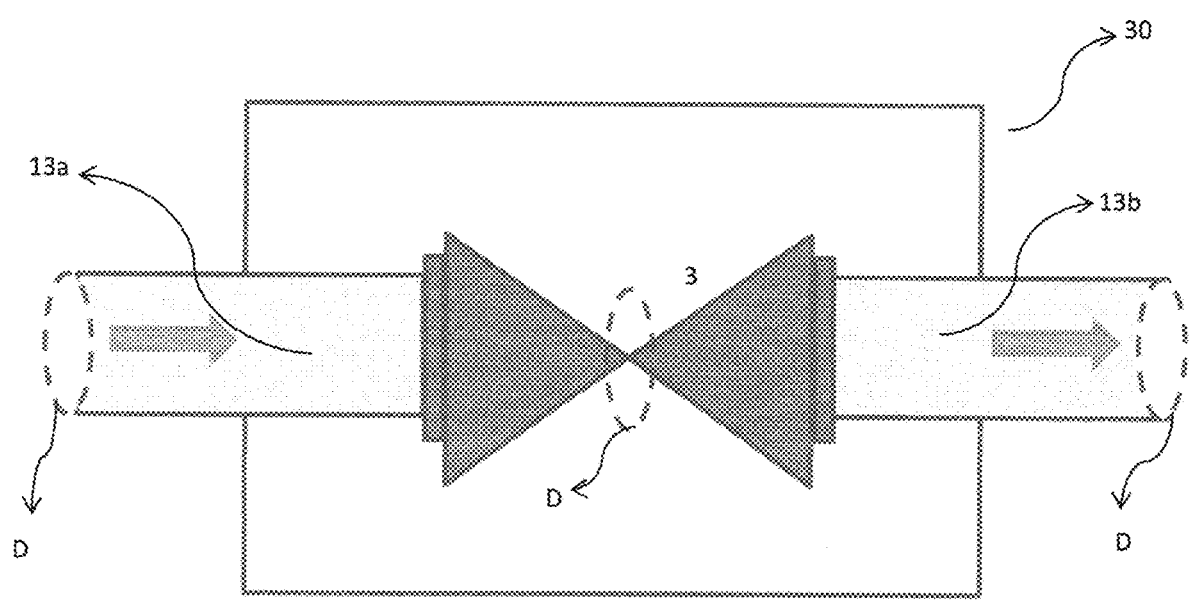
FIG. 3 shows a single solenoid electric-valve as is customary in the art to allow or block the flow of water.

FIG. 3 shows a detailed view of the medium 30 most used in the art, wherein it is used one single electric-valve commonly an electromechanical solenoid valve 3. Said electromechanical valve 3 has a diameter of operation D that is compatible with the diameter of operation of the pipeline section 13a and the pipeline section 13b. That is, the diameters of operation, which define the water flow capacity, are the same between the electromechanical valve 3, the pipeline 13b and the pipeline 13b. The operation of the electromechanical valve 3 is open, wherein the electromechanical valve 3 is completely open and allows the water to flow, wherein said flow has the same characteristics to the water flow passing through the valve 11 and the pipeline 13th (for this example the friction caused by the flow piping configuration is negligible); and a closed state in which totally blocks the flow of water. Flow regulation from this configuration is not possible.

One skilled in the art may notice that the same characteristics shown in FIG. 3 for the supply of cold water, are valid for the supply of hot water.

Figure 4:
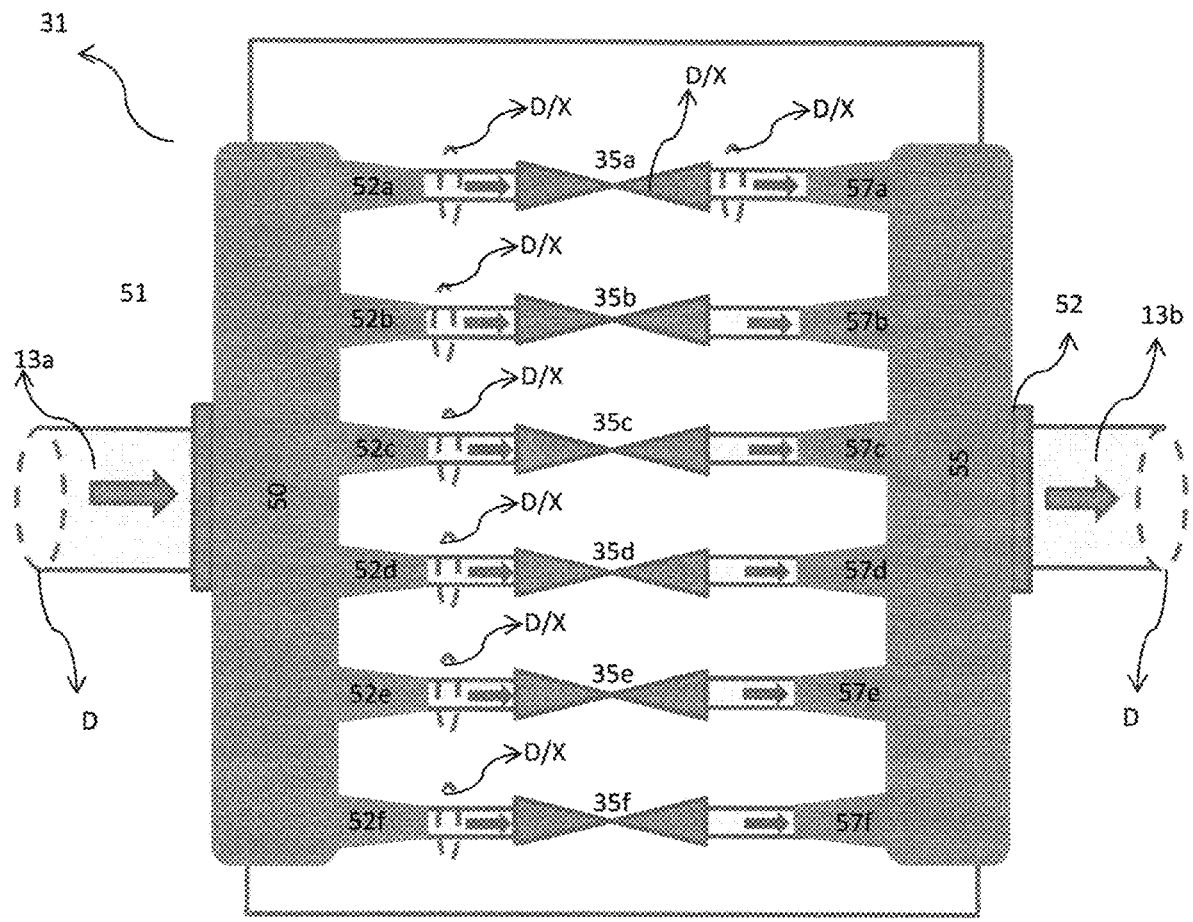
FIG. 4 shows a system of electric-valves connected through two splitters in accordance with the present invention.

FIG. 4 shows an embodiment of the system of the present invention that includes a device 31 that permits the regulation of the flow of water using a plurality of valves. The configuration of the device 31 also permits a direct replacement of the medium 30 shown above, since the input and output of devices 30 and 31, are the same. The device 31 allows the pass of flow and blocks the flow, as well as allows the regulation of said flow of water.

FIG. 4 shows how the flow of water is coming from the supply 10 and travels via the pipeline 13a which has a diameter D, wherein a manifold or divisor 50 is coupled. The manifold 50 has an inlet 51 which is compatible with the pipeline 13a, wherein said manifold defines a plurality of sub-channels connected in parallel through a plurality of outputs 52a-52f, which will be called output 52. Each of the outputs 52 have a diameter of operation D/X that is smaller than the diameter D, and wherein said diameter of operation D/X defines the diameter of operation of each element comprising each sub-channel from 52 to 57 as follows. The number of sub-channels may vary without affecting the scope of the present invention. An example with six outputs 52 is shown in FIG. 4, wherein all the outputs 52 have the same diameter of operation D/X. Normally the diameter D/X represents a fraction of the diameter D, because this is how it is available in the market. In one embodiment of invention, the total sum of the flows of each sub-channel corresponds approximately to the flow defined by the diameter D. After each output 52, a electromechanical means 35a-35f that allows the flow or block the flow is coupled in each sub-channel as shown in FIG. 4. Similarly, mechanical valves may be coupled before each means 35a-35f to allow replacement of said means without stopping the water supply in case of failure. In one embodiment of invention, each means 35a-35f corresponds to a solenoid valve already known in the art. Also, a inverse-manifold 55 or second manifold or divisor with the same characteristics to the manifold 50, is inversely connected through its inputs 57a-57f to each sub-channel accordingly. The output 56 of the inverse-manifold 55 has a diameter of operation D compatible with the pipeline 13b ensuring compatibility with any existing faucet system. Each means 35a-35f, which will be called means 35, is controlled by electrical signals received from a programmable element (not shown in FIG. 4) like a microcontroller, microprocessor, computer, etc., and wherein said programmable element receives the order to activate the means 35 by the use of electrical signals received from sensors or any compatible user interface. One skilled in the art will notice that the programmable element may need an electronic circuit for protection and/or compatibility already known in the art, as well as corresponding housing for protection against the environment. For example, the programmable element sends electrical signals to close or block the flow for the half of means 35, i.e., in the means 35a, 35b and 35c (the means 35d, 35e and 35f are maintained in an open state) and thus dividing the original flow to the half, which is reflected at the outlet 6 of the faucet 5 as a lower flow. Thus, it is possible to regulate the original flow defined by the diameter D, through combinations of sub-channels with a plurality of possible levels of flow defined by the open state and closed state of each sub-channel (six sub-channels for this example).

A person skilled in the art will note that the same features shown in FIG. 4 for the cold water supply, are valid for hot water supply, wherein combinations of sub-channels in open state and sub-channels in close state, either for the hot water supply and/or the cold water supply, represent different levels of warm water at the outlet 6 of the faucet 5.

Figure 5:
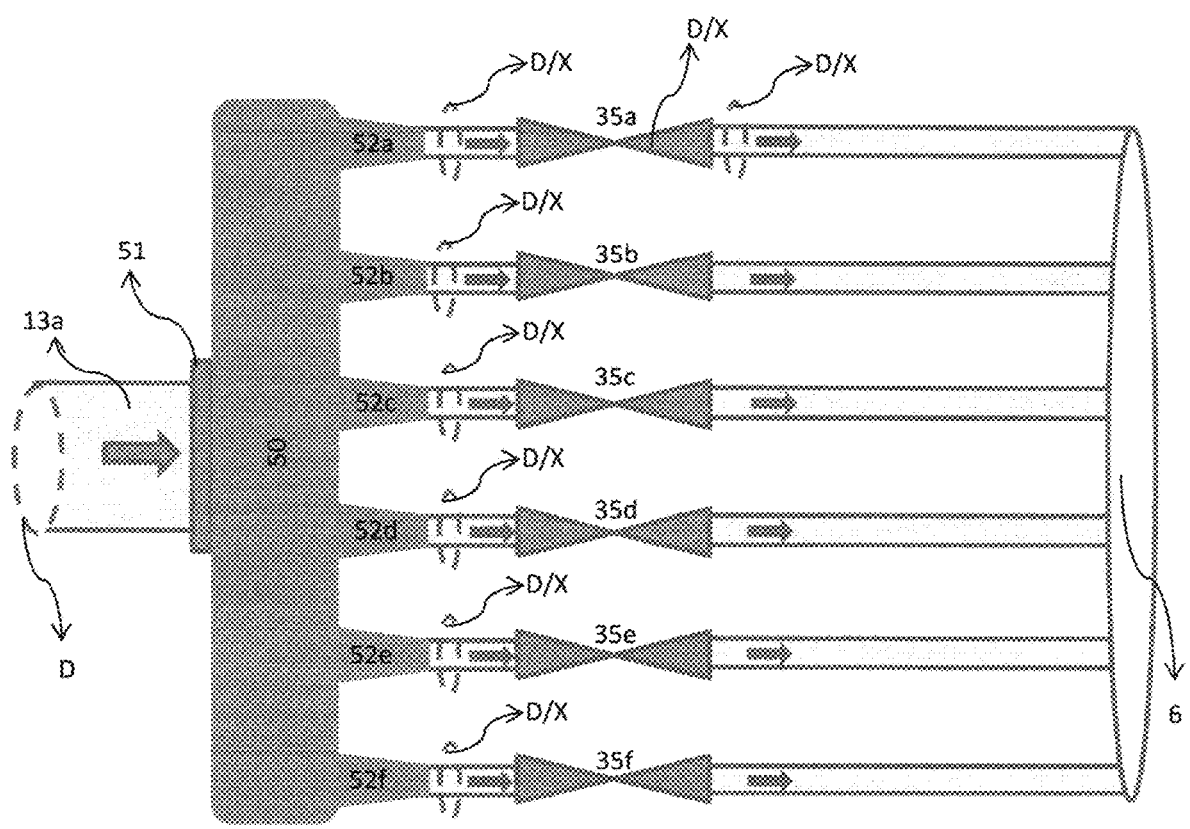
FIG. 5 shows an embodiment of the invention of FIG. 4, wherein the sub-channels are kept separate until the outlet of water.

An embodiment of invention is found in FIG. 5, wherein a variation of the device of the FIG. 4 is shown, wherein each sub-channel is directly connected to the outlet 6 of the faucet 5, wherein each sub-channel in open state is able to be visibly differentiated by the user.

Figure 6:
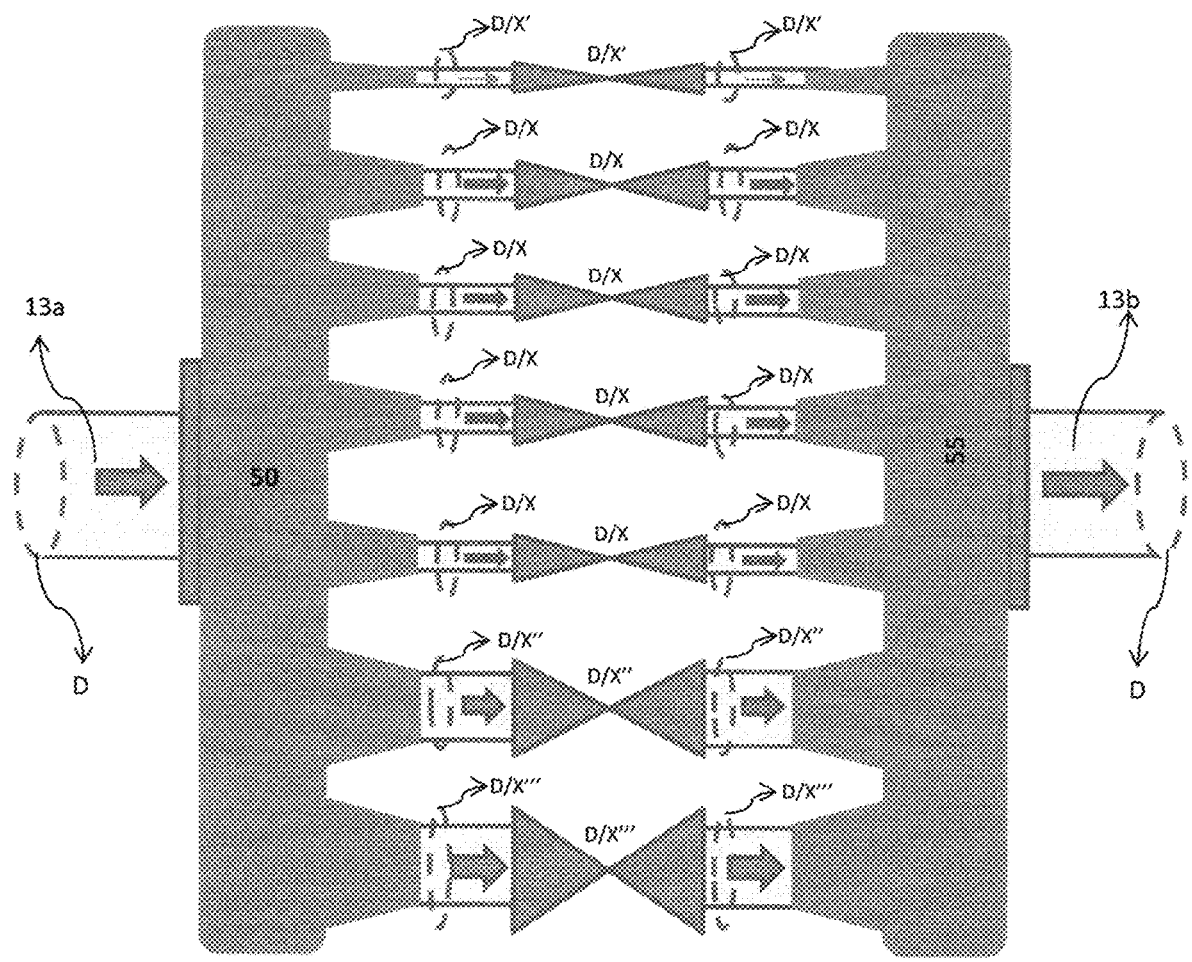
FIG. 6 shows an embodiment of the invention of FIG. 4, wherein the sub-channels have different diameters of operation.

FIG. 6 shows an embodiment of invention wherein the sub-channels have different diameter of operation, that is, some sub-channels have a diameter of operation D/X', other sub-channels have another diameter of operation D/X, other sub-channels have a diameter of operation D/X" and other sub-channel has a diameter of operation D/X'''. The use of different diameters of operation is done in order to save resources by reducing the number of sub-channels but maintaining the same results. For example, using a sub-channel of ¼ instead of four sub-channels of ⅛ maintains the same result. All diameters D/X, D/X', D/X" and D/X''' have a smaller diameter of operation than the diameter of operation of the supply D, wherein X, X', X" and X''' represent fractions of the diameter D according to the availability in the market. For example, in order to reduce the flow defined by the diameter D to the half, it is possible to accomplish it either by using two sub-channels in open state with diameter of operation D/2 or eight sub-channels of diameter of operation D/4.

Thus, through combinations of sub-channels in the open state (allowing flow) and sub-channels in a closed state (blocking the flow), or also named combinations of opening and closing valves, it is possible to electronically regulate the flow provided by the supply. Also, if combinations are performed on the side of the cold water supply and combinations on the side of the hot water supply, at the outlet 6 of the faucet 5, where both parts are mixed, it is possible to electronically regulate the temperature, forming different levels of warm water, wherein the warm water is any water product of the mixture of hot and cold water.

Figure 7:
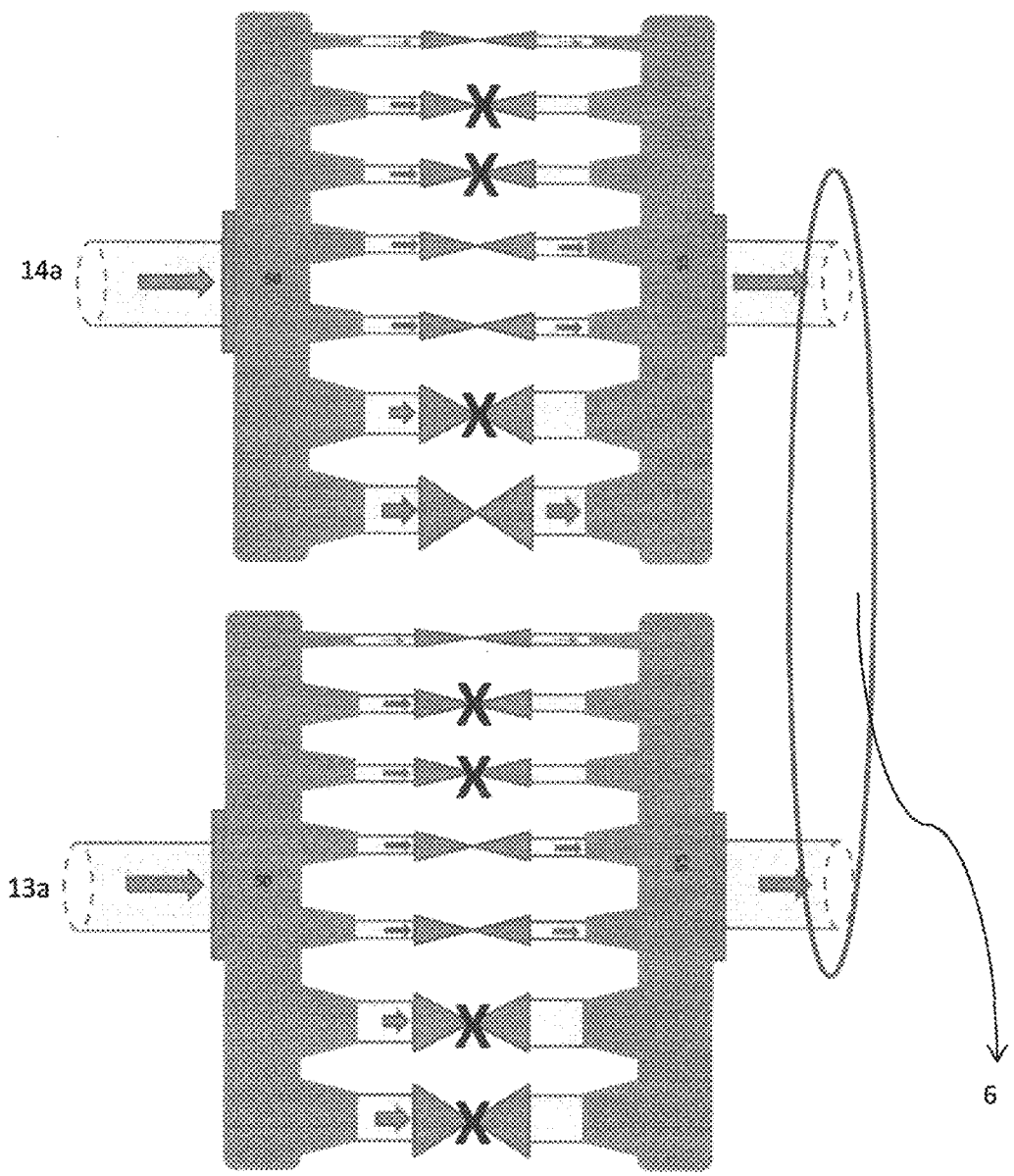
FIG. 7 shows an example of a combination to generate warm water predominately hot, wherein three sub-channels in the hot water and four sub-channels in the cold water are blocked.

FIG. 7 shows an example of combinations on the cold water side as well as the hot water side and thus at the outlet 6 a mixture is performed generating warm water at a certain level. In FIG. 7 it can be seen that on the side of the hot water, determined by the supply 14a, has three sub-channels in the closed state, however, its counterpart of cold water, defined by the supply 13a, has a larger number of sub-channels in the closed state, that is, four sub-channels including the sub-channel with the largest diameter of operation. In such a way that the flow of cold water is smaller than the flow of hot water and when mixed at the outlet 6 of the faucet 5, predominantly hot warm-water is generated.

A technician may notice that it is possible to perform combinations that maintain performance patterns, wherein said patterns are selected from the list of: adjusting the temperature by maintaining the flow, adjusting the flow maintaining the temperature, and adjusting the temperature by adjusting the water flow. Thus, the different possible combinations generate different levels of warm water and different levels of water flow. In an embodiment of invention the criteria that define the opening and/or closing of sub-channels are selected from the list of performance patterns defined by adjusting the temperature by maintaining the flow, adjusting the flow maintaining the temperature, and adjusting the temperature by adjusting the flow.

Particularly, the performance patterns are selected from the list:
 Starting flow
 Stopping flow
 Increasing flow while maintaining temperature
 Decreasing flow while maintaining temperature
 Increasing temperature while maintaining flow
 Decreasing temperature while maintaining flow
 Increasing flow while increasing temperature
 Decreasing flow while decreasing temperature
 Increasing flow while decreasing temperature
 Decreasing flow while increasing temperature
 Maintaining temperature while maintaining flow
 Wherein the starting flow is performed using a predetermined combination that provides a minimum flow of comfort of warm water.

For example, in order to increase the temperature while maintaining the flow, one sub-channel of cold water switches into a closed state and simultaneously at least one sub-channel (or a sum of sub-channels equivalent) of hot water switches into an open state, the at least one sub-channel provides an equivalent flow as the flow provided by the sub-channel of cold water recently switched (supposing that the sub-channel of cold water is in an open state). In this regard, in order to increase the flow while maintaining the temperature one sub-channel of cold water switches into an open state, while simultaneously at least one sub-channel of hot water (or sum of equivalent sub-channels) switches into an open state open, wherein the at least one sub-channel provides an equivalent flow as the flow provided by the sub-channel of cold water recently switched.

In a scenario wherein all the diameters of operation are different to each other, there are $2^N$ possible combinations, where N is the total number of sub-channels. In an embodiment, the configuration of sub-channels of cold water is the same as the configuration of the sub-channels in the hot water.

In an embodiment of invention, each performance pattern is selected by a user from a user interface, wherein the user interface can be implemented using different methods as: presence detection areas, speech recognition control, any manual switch, etc.

Figure 8:
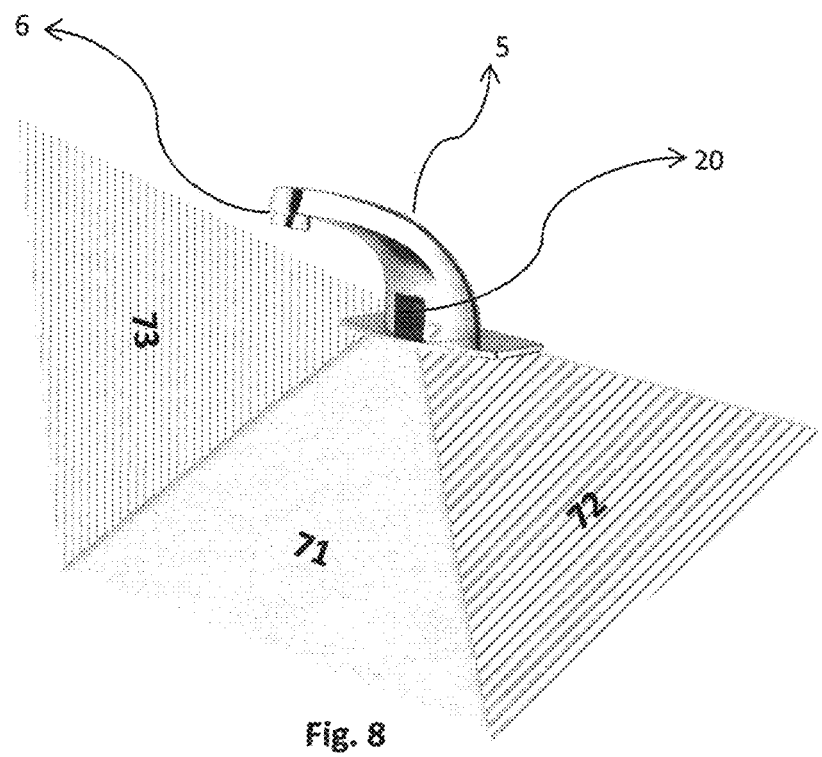
FIG. 8 shows an isometric view of an example of touchless interaction with the user by the use of areas of detection and approaching of objects located around the area of outlet of water.

FIG. 8 shows an isometric view of an embodiment of invention wherein the present invention interacts with the user for activation and/or regulation, by means of detection zones. The detection zones are defined by at least one sensor or detector of one or different types which detect presence or motion, including the approach and withdrawal of objects, either individually or together, within an area wherein said at least one sensor or detector is directed and wherein said zone has limits defined by the coverage of said at least one sensor or detector. The presence or motion can be any object or any part of a human being. Each detection zone, once an object is detected, sends a signal that can be interpreted by the programmable element based on a previous configuration, and thus the programmable element performs the operation related to the opening and closing of a sub-channel, either to start, block, adjust the flow and/or adjust the temperature. Normally the coverage area of each sensor or detector is configurable. The sensors or detectors, which will be called means for detection, are coupled to the programmable element that controls the opening and closing of the sub-channels. A technician may notice that the sensors used may vary without affecting the scope of the present invention. Said sensors may be selected form the list of: infrared sensors, capacitive, Doppler radar, or ultrasonic, etc., wherein some of these sensors provide sufficient data to determine whether the object is moving away or approaching.

In an embodiment of invention, each detection zone activates a different performance pattern.

In an embodiment of the invention, the user interacts with the current invention using one single detection zone 71, which is in the area of falling water at the outlet 6 of the faucet 5. This detection zone 71 includes electronic means to determine the approaching of objects or users. In an embodiment of invention, once an object or user is detected, the system provides a water flow, wherein said flow corresponds to a minimum flow of comfort and, if an approaching is detected, the flow increases in proportion to the approach or in predefined units. Once the object or user is not detected, the system sends the order to block the flow completely.

In an embodiment of the invention, a second detection zone 72 and a third detection zone 73 are utilized to provide user interaction, wherein the zone 72, upon detection of an object, increases the flow of water in an immediate possible unit defined by a corresponding combination, and the zone 73, upon detection, reduces the flow of water in an immediate possible unit defined by another corresponding combination.

Figure 9:
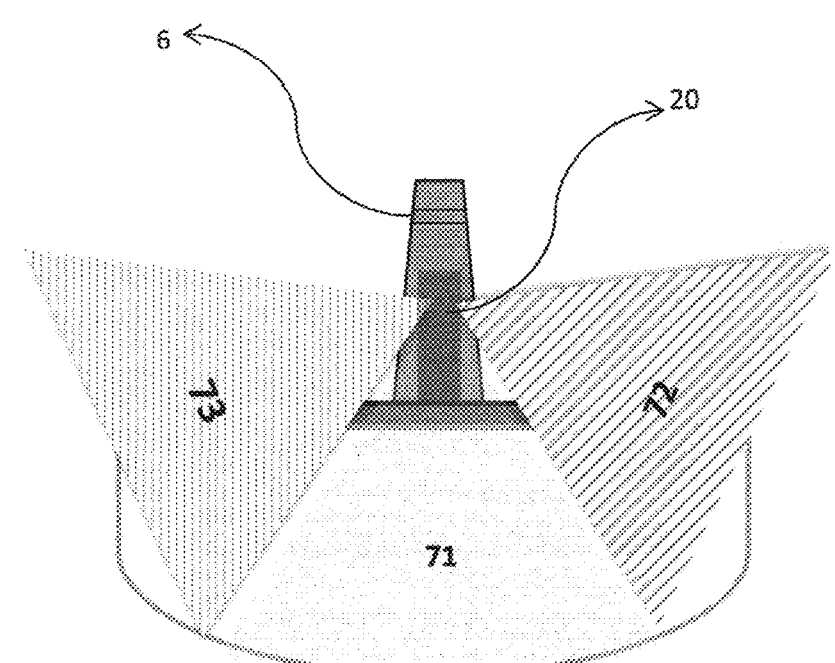
FIG. 9 is a front view of the example shown in FIG. 8

The FIG. 9 shows a front view of the detection zones 71, 72 and 73.

Figure 10:
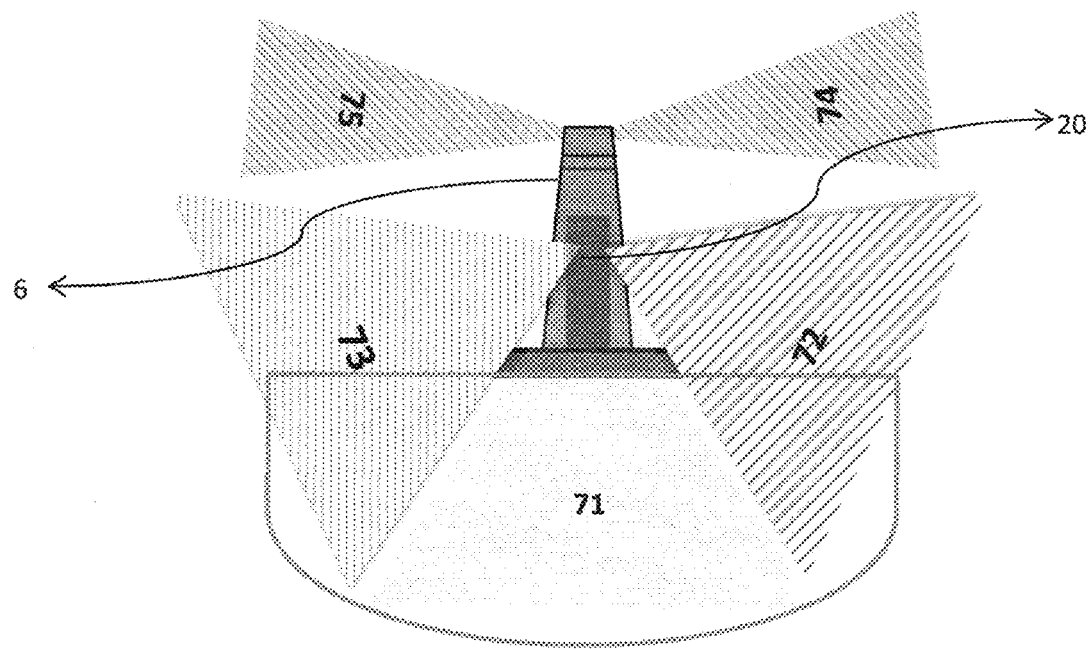
FIG. 10 shows an embodiment of the invention shown in FIG. 8 wherein five areas of detection and approaching of objects activate the regulation of the flow and the regulation of the temperature.

The FIG. 10 shows an embodiment of the invention, wherein a fourth detection zone 74 and a fifth detection zone 75 are included. The zone 74, upon detection, increases the temperature in an immediate possible unit, either by opening a sub-channel of hot water and/or closing a sub-channel of cold water. The zone 75, upon detection, decreases the temperature in an immediate possible unit, either by opening a sub-channel of cold water and/or closing a sub-channel of hot water. One skilled in the art will note that the detection zones may be located in different locations that those shown in the Figures.

Figure 11:
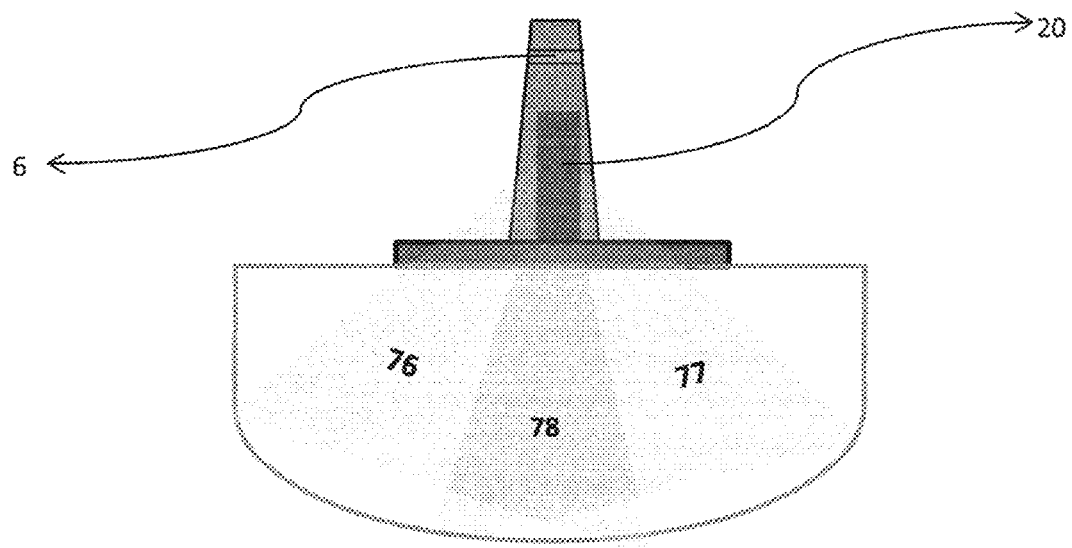
FIG. 11 shows a front view of an embodiment of the present invention wherein two areas of detection and approaching of objects, wherein the areas are partially overlapping defining a third area, activate the regulation of the flow and the regulation of the temperature.

The FIG. 11 shows an embodiment of invention that includes only two detection zones 76 and 77, which also detects the approach and withdrawal of objects. The detection zone 76 corresponds to the decreasing of the temperature by maintaining the flow and the detection zone 77 corresponds to the increasing of the temperature by maintaining the flow. Furthermore, in an embodiment of the invention, a detection zone 78, which is defined either by a separate area or the area where the zones 76 and 77 are overlapped, bond, or partially together corresponds to the detection zone of warm water, which corresponds to the default selection once an object is placed at the outlet 6 in any starting point of the cycle of operation. These detection zones 76 and 77, and therefore the zone 78, have means for detecting the approach of an object or user. Thus, once the movement towards of the object to the detection zone 20 of the faucet 5 (where the detectors or sensors are located) is detected, the flow of either cold, hot or warm water corresponding to the movement towards from the zones 76, 77 or 78 respectively, increases proportionally to said movement towards or by time detected. In an embodiment of the invention, after a first detection of an object, the flow of warm water (50% cold water and 50% of hot water) in a minimum possible flow or minimum of comfort for the user, is conducted in order to avoid the waste or unnecessary use of water. The first detection is defined by a detection that occurs after blocking the flow because no object or user is detected in any of the detection zones, therefore a new cycle of operation starts. In one embodiment of invention, the detection in the zones 76 and 77 activates the pattern of adjustment of temperature while maintaining the flow, and the approaching from each one of these zones activates the pattern of adjustment of flow by adjusting the temperature. The detection in the zone 78 maintains the flow and maintains the temperature, and the approaching from 78 maintains the temperature by increasing the flow.

Additionally, in an embodiment of the invention, separately and/or parallel to the interaction with the user by direct contact means, an interface that supports voice recognition and/or speech recognition, that will be named voice control (not shown in FIGS. 8-11) is coupled to the programmable element. Thus, upon detection of any appropriate word or phrase a corresponding performance pattern is activated, so that the system is able to regulate the flow and/or the temperature, by the use of the voice of the user. In this regard, the list of words and/or phrases detectable by the voice control are words and/or phrases related to the operation or performance pattern to be executed as "increase," "decrease", "temperature", "more", "less", "hot", "cold", "warm", "hotter", "less hot", "cooler", "less cold", "high", "turn off", "more flow", "stronger", "less strong", "less flow", "more volume", "lower volume", "stop", "maintain", "maximum", "minimum", among others. This feature is desirable when the user cannot use his hands to activate or regulate the flow of water. For example, by holding a big container with both hands.

Figure 12:
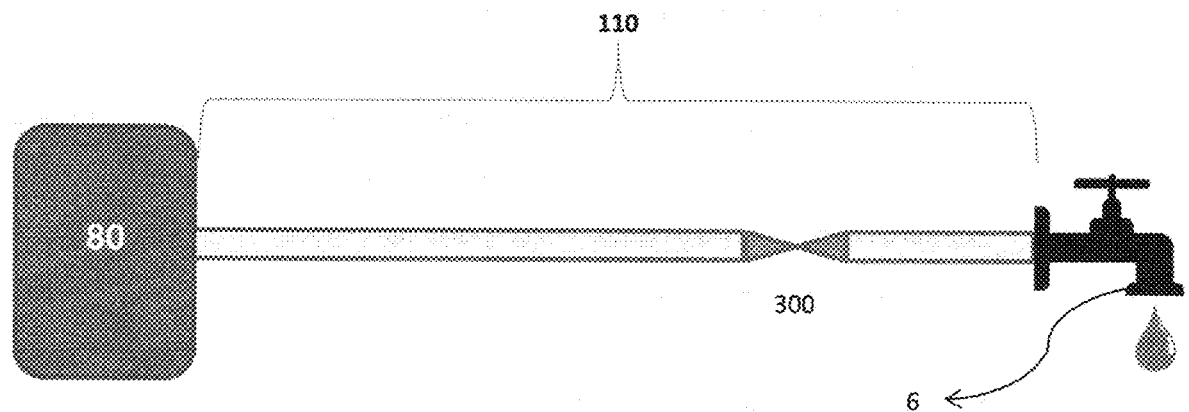
FIG. 12 shows a diagram of a water distribution system as is customary in the art, wherein water remaining in pipeline is usually wasted.

The FIG. 12 shows a configuration of the water flow control by electromechanical means, particularly for hot water, wherein there is a boiler that heats the water before this comes out of the faucet 5. This example illustrates a valve 300, which may be mechanical, electromechanical, a single valve or a valve system such as the one shown previously. A person skilled in the art will note that such valve is shown for illustrative but not limitative purposes. In this regard, there is a pipeline section 110 wherein hot water remains after the user no longer uses the hot water. The water remaining in 110, which is originally hot water, begins to cool to become cold water or not-hot water. Thus, when the user wants to reuse the hot water by selecting the faucet outlet 5 for hot water, first said remaining water of the pipeline 110 is out of the outlet 6, but is not used by the user because it is not hot, i.e. that water is wasted.

Figure 13:
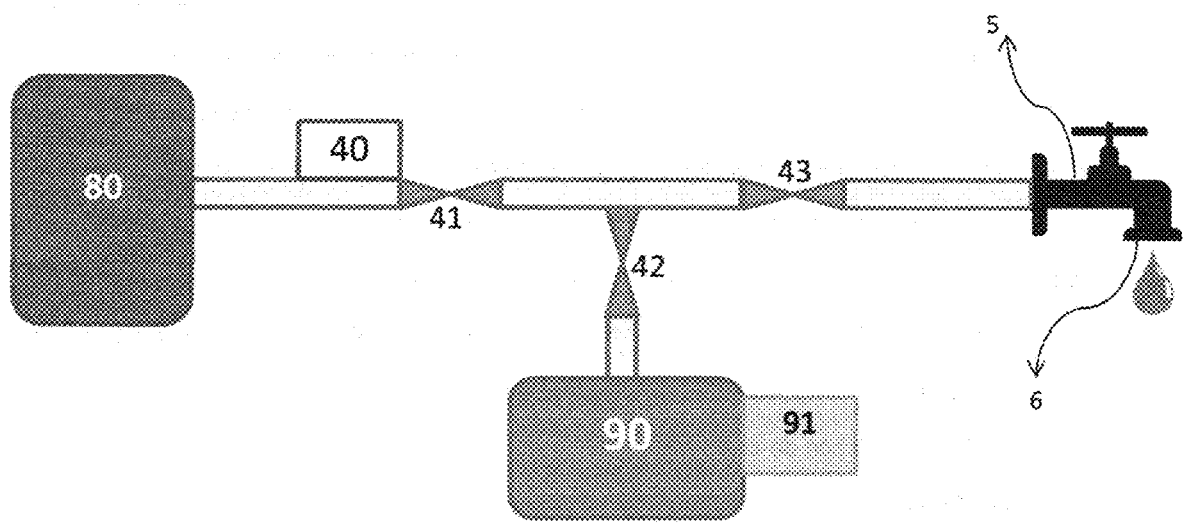
FIG. 13 shows a diagram of a system that reuses the water remaining in pipeline redirecting said water into the water supply system.

In this regard, the FIG. 13 shows an embodiment of the invention wherein the waste of said remaining water is avoided. A valve system 41, 42 and 43, as well as an auxiliary or secondary water deposit 90 is used to collect not-utilizable water through various configurations or combinations of opening and/or closing of said valves 41, 42 and 43. The deposit 90 is connected to the pipeline using a normally closed electric-valve 42, wherein said deposit 90 is located close and under the faucet 5. A normally open electric-valve 41 is located near the connection of the deposit 90, between said deposit and a boiler 80. An electric-valve 43, which can be the aforementioned electric-valve 30 or electric-valves system 31 of the present invention, is located after the deposit 90 near the connection of said deposit 90 and between the deposit 90 and the faucet 5. The electric-valves are coupled to the programmable element. A thermocouple or temperature sensor 40 coupled to the programmable element is used to measure the temperature of the water in the pipeline between the electric-valve 41 and the boiler 80. Additionally, a water level sensor 91 coupled into the programmable element, is used in the deposit 90 to determine whether said deposit may be close to saturation.

Figure 13A:
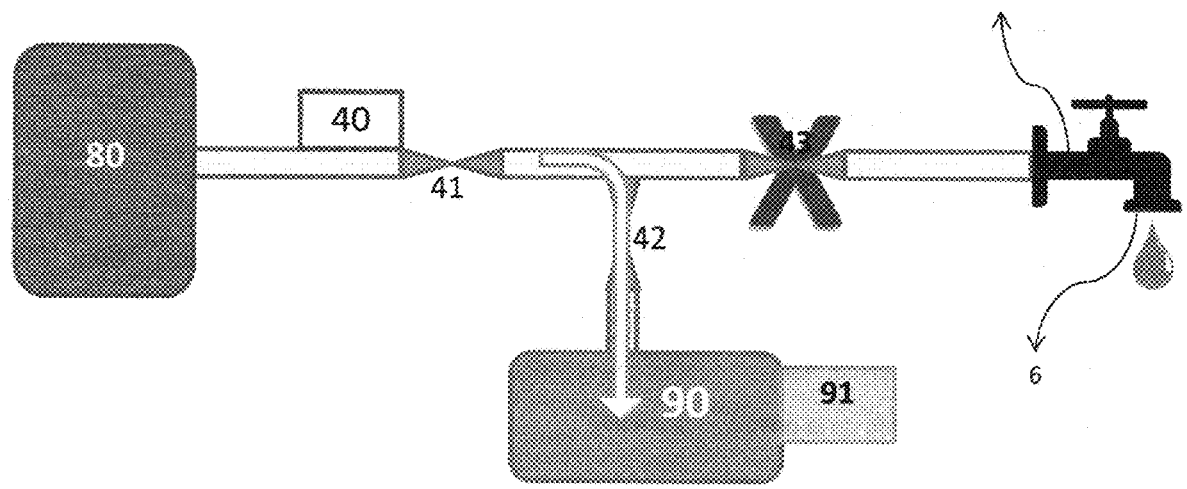
FIG. 13A shows a first operating position of the system of FIG. 13, wherein water is sent directly to an auxiliary or secondary deposit.

Thus, when a user has selected the use of hot water, the temperature detector 40 determines whether the temperature of the water that is currently in the pipeline, i.e., the water remaining in pipeline has sufficient temperature to be considered as hot, wherein said consideration is based on a previous configuration. This consideration is made in a previous configuration. Thus, if the water is not hot, as shown in FIG. 13A, the electric-valve 43 is blocked and the electric-valves 41 and 42 are in an open state to allow the non-hot to be redirected into the auxiliary deposit 90 until the hot water is effectively detected.

Figure 13B:
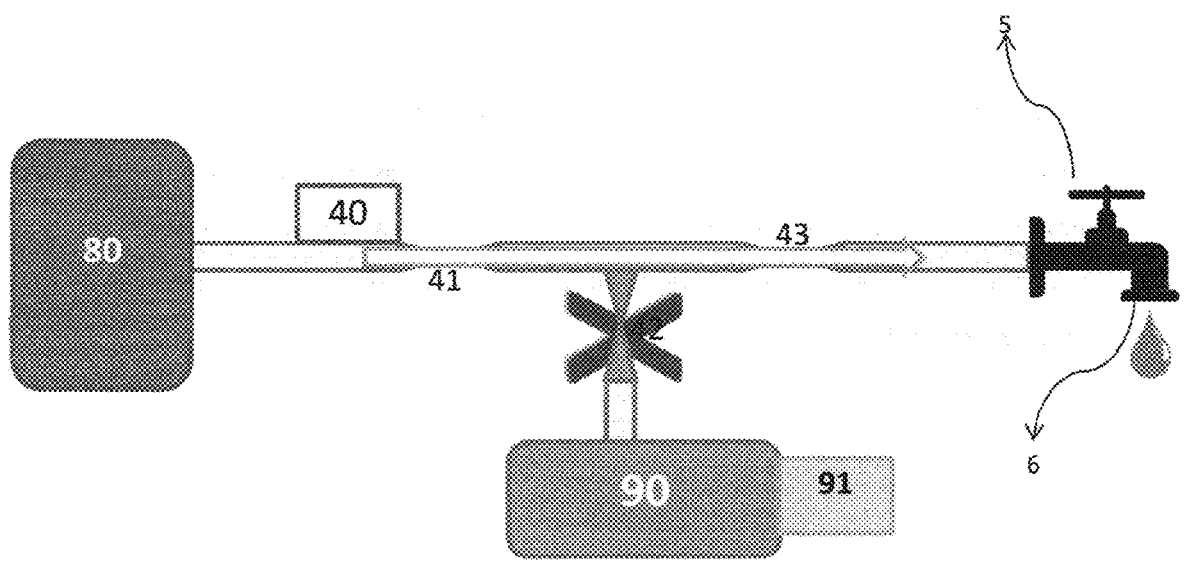
FIG. 13B shows a second operating position of the system of FIG. 13, wherein the hot water is sent directly to the outlet of water for its consumption.

The FIG. 13B shows the moment when the temperature detector 40 determines that the water temperature at that point is hot, so that the electric-valve 42 is blocked and the electric-valves 41 and 43 are in an open state, and thus the flow effectively hot goes directly to faucet 5 through the electric-valve 43, until the moment when the user is finishing the use of said hot water.

Figure 13C:
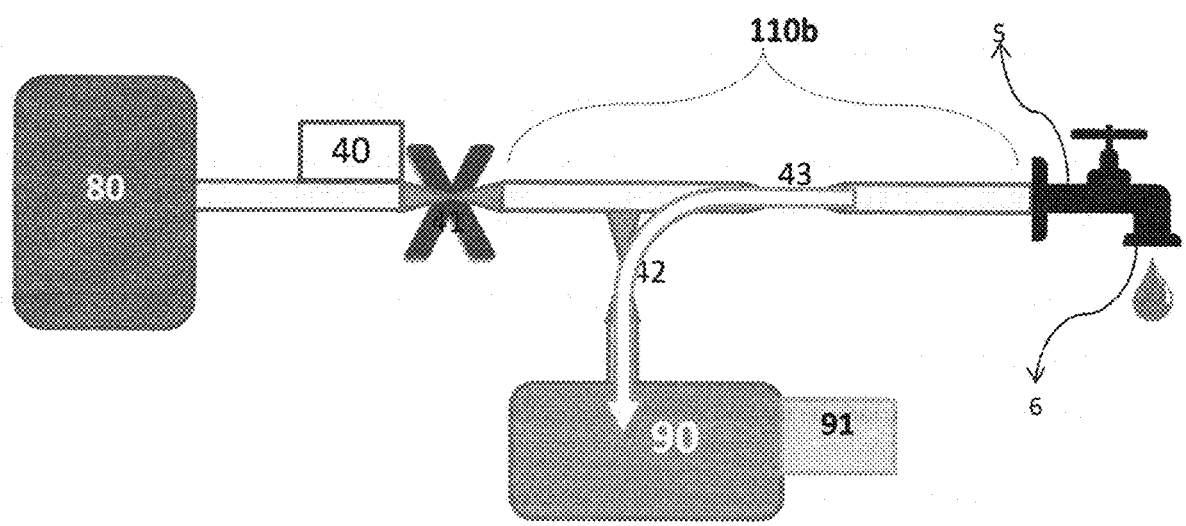
FIG. 13C shows a third operating position of the system to FIG. 13, wherein, once the user has stopped using the hot water, this hot water that is remained in the pipeline is carried by gravity to the auxiliary or secondary deposit.

The FIG. 13C shows said moment when the user has stopped using hot water, so that the electric-valve 41 switches to its closed condition blocking the flow of water in either direction, and also the electric-valve 42 and 43 are in an open condition to allow the remaining water 110b remaining in the pipeline between the faucet 5 and the valve 41 is directed to the auxiliary deposit 90. Because the auxiliary deposit 90 is below the faucet 5, the water is directed to said deposit 90 by gravity, leaving without remnants of water that can be wasted.

Once the remaining water is inside the auxiliary deposit 90, the water can be injected back into the water mains 10 (in the cold water supply) by means of a pump, or by gravity into a cistern. In one embodiment of invention, the deposit 90 is a pipeline that goes directly to the cistern or equivalent, or is immediately injected into the water mains by means of a pump.

In one embodiment of invention, a water flow detector 81 (not shown in the figures) is placed between the electric-valve 41 and the boiler 80 to identify when the hot water has been selected.

Figure 14:
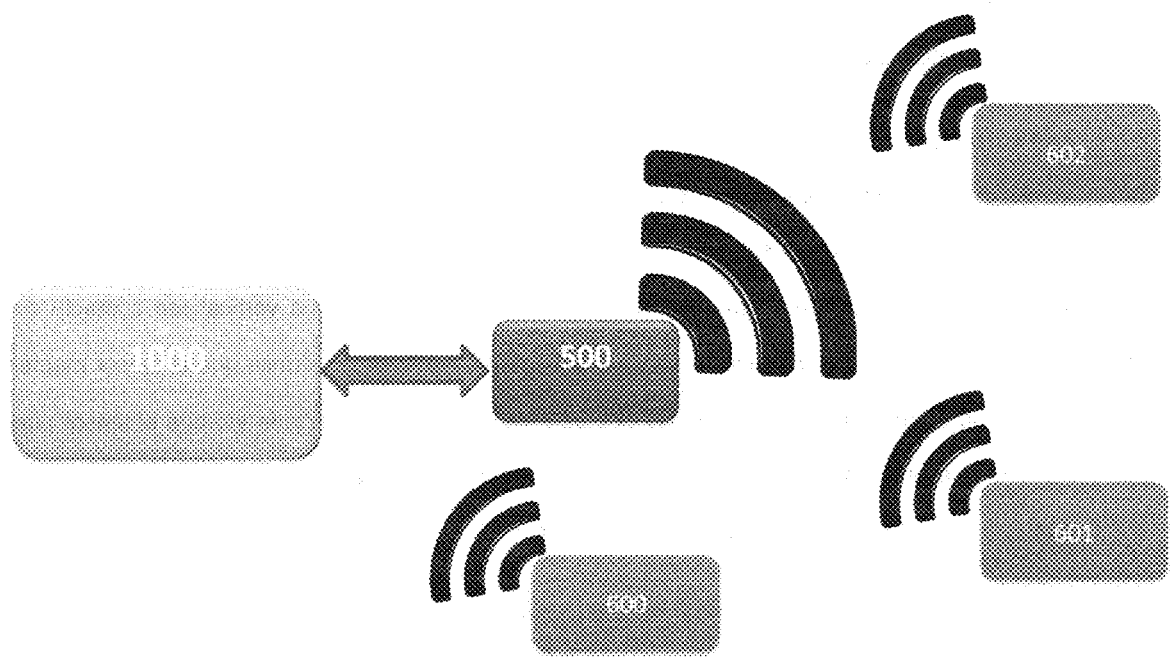
FIG. 14 shows a diagram in which a transceiver is coupled either to the system of FIG. 1 or the system of FIG. 13, for communication and remote control through a compatible client device.

The FIG. 14 shows an example of connection with a transceiver 500, which is coupled into the programmable element to allow communication and remote control of any of the systems and/or devices 1000 disclosed herein with any compatible electronic device 600, 601, 602, etc., as a client device. The communication can be performed through wireless communication technologies already known in the art. The transceiver 500 is coupled to the programmable element.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

The invention claimed is:

1. A method for reusing the remnants of water in a pipeline of hot water between a hot water supply and an output of hot water for a user, wherein the method includes electronic means for determining the temperature of water that passes through the pipeline, the method comprising:
   permitting, upon a request of flow of hot water by a user, the flow of water from a hot water supply to a deposit of water when the temperature of the water is out of a range of temperature of comfort;
   permitting, upon a request of flow of hot water by the user, the flow of water from the hot water supply to an output of water when the temperature of the water is within the range of temperature of comfort;
   permitting the flow of water from the output of water to the deposit of water when a user has stopped the flow of hot water;
   wherein the flow of water is directed via combinations of opening and closing of a first valve connected between the pipeline and the deposit of water, a second valve connected between the first valve and a hot-water supply, and a third valve connected between the first valve and the output of water.

2. The method according to claim 1, wherein the deposit of water is located below the output of water.

3. The method according to claim 1, wherein the method further includes electronic means for determining the temperature of water that passes through the pipeline.

4. The method according to claim 1, wherein the method further includes a water flow detector located between the second valve and the hot water supply.

5. The method according to claim 1, wherein the first valve is a normally-closed valve, and the second and third valves are normally-open valves.

* * * * *